UNITED STATES PATENT OFFICE.

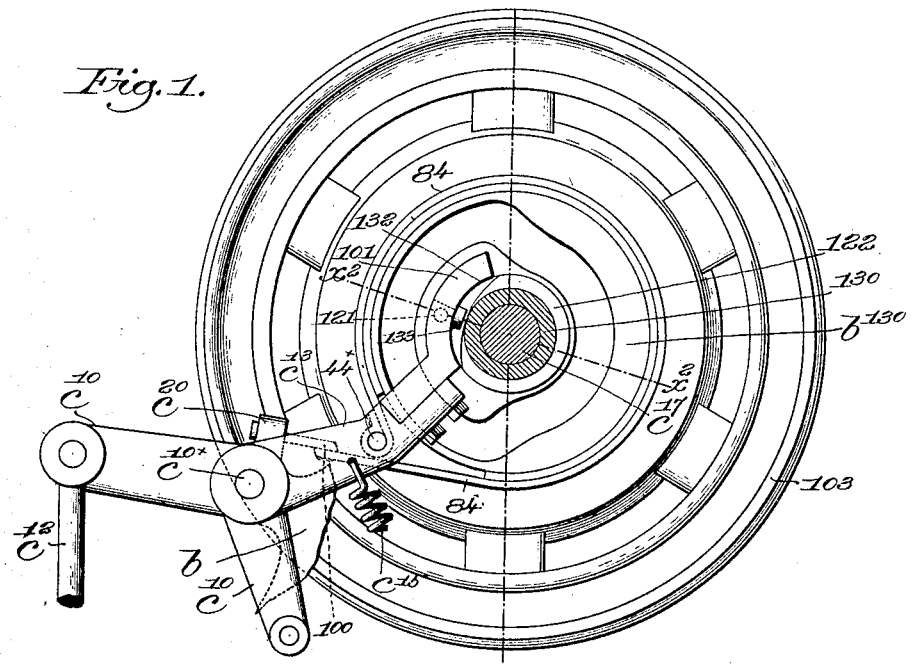

LOUIS A. CASGRAIN, OF WINCHESTER, MASSACHUSETTS, ASSIGNOR TO UNITED SHOE MACHINERY COMPANY, OF BOSTON, MASSACHUSETTS, A CORPORATION OF NEW JERSEY.

CLUTCH MECHANISM.

No. 891,907.      Specification of Letters Patent.      Patented June 30, 1908.

Original application filed September 26, 1899, Serial No. 731,698. Divided and this application filed February 23, 1901. Serial No. 48,393.

*To all whom it may concern:*

Be it known that I, LOUIS A. CASGRAIN, a citizen of the United States, residing at Winchester, county of Middlesex, State of Massachusetts, have invented an Improvement in Clutch Mechanism, of which the following description, in connection with the accompanying drawings, is a specification, like letters on the drawings representing like parts.

This invention relates to the general organization of a clutch mechanism and is designed to provide means for throwing the clutch members either into or out of engagement promptly and with precision at the will of the operator.

Clutches embodying this invention may be applied to many types of machines and they have proven especially adaptable to boot and shoe machinery. A single form of the improved clutch is shown in connection with a shoe machine in an original application filed September 26, 1899, Serial No. 731,698, of which the present application is a division. For the purposes of the specific machine shown in said original application, the clutch mechanism embodying this invention was employed in communicating motion to a shaft which was desired to be rotated. The following description will be devoted to this particular species of use of the clutch though obviously the invention is not limited to such use.

A clutch mechanism made in accordance with this invention combines many advantageous features which adapt it for use on machines where promptness and precision of starting and stopping are particularly required, as is the case when a machine must be stopped immediately upon the completion of a certain operation or cycle of operations, or immediately at the will of the operator, in order to avoid a partial repetition of the operation or to prevent spoiling the work which is being manipulated. It will be noted, for example, that the operator's control over the clutch is exercised negatively; that is to say, the operator does not himself supply the force which positively throws the clutch, but he merely releases another source of energy which itself, being immediately responsive, automatically effects the throw of the clutch. This is true relative to throwing the clutch members both into and out of engagement. Obviously the action of an automatic mechanical clutch-throwing instrumentality is much more precise and decisive than would be the action of any sort of manually applied impulse, whence it arises that the communication of uniform motion from the active driving member of the clutch to the passive driven member, according to this invention, is completed accurately and almost instantaneously, eliminating the usual intermediate period of variant motion caused by imperfect or incomplete engagement of the clutch members; and likewise the communication of motion is interrupted in an equally effective manner. However irregular or vacillant may be the release of the clutch-throwing instrumentalities, they themselves, when permitted to act, act uniformly so that the effect upon the operation of the machine is always the same.

The automatic clutch-throwing instrumentalities, as shown in the accompanying drawings for purposes of explanation, consist of two mechanical motors (hereinafter, for convenience, designated "springs"), one of which serves directly to engage the clutch members, the other serving indirectly to release them. These springs, as shown herein, perform their clutch-throwing offices by causing the shift of one of the clutch members axially on a shaft toward and from the other clutch member. The manner in which their respective forces are applied automatically to effect this shifting is of importance. It has been a common expedient to effect an axial displacement of one of the clutch members from the other by means of a rotating cam, carried by the member to be displaced, and a relatively rigid pin, or the like, projected into the path of the cam at the appropriate moment to cause the cam to shift axially on its shaft. Also an arrangement has been used wherein a cam is supported independently of the clutch member and is applied to some part rigid with said member, the effect being substantially the same. In either of the cases here suggested the initial force exerted through the cam has a direction perpendicular to the acting surface of the cam which is commonly oblique to the shaft. A single component of this force is effective to shift the member axially, *i. e.* the component parallel to the axis.

The remainder of the force exerts a torsional effect upon all the parts concerned including the bearing surfaces of the clutch member and its shaft. Thereby said member is given a tendency to bind on its shaft and the frictional resistance offered to its shifting and to its rotation is greatly augmented. In time this friction will so wear the bearing surfaces as to cause uneven, untrue rotation thereon which diminishes in a great degree the effectiveness and accuracy of the clutch's operation. The present invention obviates this serious difficulty by applying force automatically to the member to be shifted in a single direction, i. e. substantially in the direction of the shifting movement of the member. Thus the member is acted upon positively by a single force, automatically applied, all of which is effective to move the member in the desired direction without involving any material torsional tendency.

Other advantages residing in a clutch mechanism embodying this invention will appear hereinafter in the description of a specific type of improved clutch.

The above observations will serve to exemplify the various objects of the invention.

The accompanying drawings illustrate the clutch mechanism shown in the aforementioned original application of which this is a division.

Figure 1 is a side elevation of the clutch, with a shaft in cross-section, showing the passive driven member and clutch-releasing devices. Fig. 2 is a section on the line $x-x$ of Fig. 1, viewed from the right. Fig 3 is a section on the line $x'$ of Fig. 2. Fig. 4 is a side view of one of the mechanical details of the clutch mechanism. Fig. 5 is a sectional detail on the line $x^2$ $x^2$, Fig. 1, to be hereinafter referred to.

For convenience in description, the mechanism of the specific clutch shown in the drawings may be divided into four parts; to wit;—a shaft $c^{17}$, an active driving member 127, a passive driven member 103, a clutch-engaging motor spring 119, and a clutch-releasing device comprising a lever $c^{10}$, $c^{13}$ and other parts associated with it.

The shaft $c^{17}$ is journaled in suitable bearings $b^{20}$ only one of which is shown in the drawings (see Fig. 2). For the purposes of the machine shown in the aforementioned original application, a shaft was desired to be rotated and accordingly the shaft $c^{17}$ is shown herein as having the passive driven clutch member 103 fixed rigidly thereto through its hub 122 so that when said driven member receives motion from the driving member the motion is communicated to the shaft.

The active driving member 127 is conveniently given the form of a pulley rotatable and axially movable on the shaft. This pulley constitutes the intermediary which receives power from any suitable source (as through a running belt) and applies it, when permitted by the clutch, to the operation of the machine. A frusto-conical clutch-surface on the pulley 127 coöperates with the correspondingly shaped clutch-surface on the passive driven member 103 to drive said driven member when the clutch is engaged. The manner in which the driving member 127 is carried on the shaft, in this particular embodiment of the invention, is of importance. The clutch is thrown into or out of engagement by moving the clutch members toward or from each other and accordingly (the driven member being in this instance rigid with the shaft) it is important that the driving member be given axial movement. The driving member being continually rotated it must also have rotary movement about the shaft. If the same bearing surfaces supported these two motions, as, for example, if the driving member were seated directly on the shaft, the two motions would conflict whenever the clutch is thrown, setting up a compounded spiral motion, and all the wear and abrasion caused thereby would be borne alone by the shaft. This is avoided by the present arrangement wherein a sleeve 126 is interposed between the hub of the driving member 127 and the shaft $c^{17}$. This sleeve may be free to rotate or move axially on the shaft, but it will normally be retarded from moving otherwise than axially, and as it so moves it will convey the driving member with it since the driving member is prevented from having any material axial movement on the sleeve by the flange 125 of the sleeve and a collar 152 presently to be described. In this manner the adjacent bearing surfaces of the shaft and sleeve support all material axial movement. The driving member is freely rotatable on the sleeve and hence the adjacent bearing surfaces of the sleeve and driving member support all material rotary motion. It is evident that all compounding of conflicting movements is hereby avoided and each movement is facilitated by reason of meeting with minimum resistance. This provision is also of importance in connection with the manner of causing the axial movement referred to above, as will be later explained.

The passive driven member 103, for reasons already set forth, is in this particular embodiment of the invention rigid with the shaft $c^{17}$. The driven member as shown is conveniently arranged to constitute the carrier for a clutch-releasing link in the form of a pusher 121 which is axially movable in a suitable seat preferably extending from face to face of the hub 122 so that the pusher may be precluded from any material lateral movement by being supported throughout the greater part of its length. This pusher 121 is the intermediary between the clutch-releasing devices which act on one end thereof, and the flange 125 which constitutes a shifting device immediately controlling the clutch-releasing shift of the driving member. One end of the pusher may be provided with a head 124 where it abuts against the flange 125. Thus the pusher is a loose link normally adapted for rectilinear motion only relative to the flange 125, for when the pusher remains at rest the flange is likewise stationary, and immediately either the flange or pusher begins to rotate, the other rotates concurrently. It is evident that any clutch-throwing force exerted through the pusher 121 is transmitted to the flange 125, and therethrough to the driving member, in a single direction, and it will be noted that this direction is substantially the same direction in which it is desired to move the driving member. Consequently all the force transmitted through the pusher is effective to perform its intended function, however the initial force applied to the pusher may have been first resolved by reason of having been exerted through a cam or the like. The flange 125 is preferably formed integral with the sleeve 126 but obviously this is not essential.

The spring 119, constituting a form of mechanical clutch-engaging motor, encircles the shaft $c^{17}$, between two collars 153 and 152. The collar 153 is split (see Fig. 4) and is positioned rigidly on the shaft by means of a clamp screw. The collar 152 is loose on the shaft but is normally motionless relative thereto by reason of the tension exerted by the spring. The collar 153 is the rigid abutment against which the spring acts. The force of the spring is applied through the collar 152 which is constantly held thereby against the adjacent end of the sleeve 126, and which projects far enough beyond the sleeve to embrace the end of the hub of the driving member. The spring 119 tends constantly to press the driving member into close relation with the driven member and its force, when unimpeded, is great enough to effect a secure engagement of the clutch.

In order to release the clutch it is necessary to move the driving member 127 axially against the force of the motor spring 119. This is effected automatically, when initiated by the operator, by the clutch-releasing devices comprising particularly a controlling lever $c^{10}$, $c^{13}$ and a clutch-releasing motor spring $c^{15}$ (see Fig. 1).

The controlling lever $c^{10}$, $c^{13}$ is pivoted on a suitable stud $c^{10 \times}$ rigid with some part $b$ of the frame, and a treadle rod $c^{12}$ is attached to the outer arm $c^{10}$ to permit the lever to be controlled through a treadle or the like. The arm $c^{13}$ of the lever $c^{10}$, $c^{13}$ carries a curved finger 101. The finger 101 has a cam 120 on its side adjacent to the hub 122 of the driven member. As the lever $c^{10}$, $c^{13}$ is rocked clockwise about its pivot, as shown in Fig. 1, the cam is protruded into the rotary path of the outer end of the pusher 121. During its rotation the end of the pusher will impinge upon this cam which, being obliquely disposed relative to the pusher, is adapted to give the latter the axial movement which moves the flange 125 against the spring 119 and thereby releases the clutch. It is frequently desirable to stop the rotation of the driven member at such a point that the action of the machine will be arrested at a predetermined stage in its cycle of operations. To this end the hub 122 of the driven member is provided with a depression 132. Cooperating with the hub is a lug 133 rigid with the finger 101. When the lug 133 is riding on the projecting face of the hub 122 the cam 120 on the finger 101 is maintained out of the path of the pusher 121 and is thereby prevented from releasing the clutch; but when the lug 133 engages the depression 132 the finger 101 moves toward the shaft into the path of the pusher which is thereupon given its prescribed rectilinear movement to shift the flange 125 and thereby release the clutch. The lug 133 and depression 132 may be relatively arranged to stop the machine at any desired point. In order that the momentum of the rotating parts may not carry the operation of the machine beyond the desired point, it is convenient to provide a brake which shall act as a check at the appropriate moment. With this in view a portion of the hub 122 of the driven member 103 is encircled by a brake band 84 which when drawn tightly thereabout exerts a friction which is enough to oppose the momentum of the moving parts and stop the machine. The brake band is attached at one end to a pin $44^{\times}$ carried by the lever arm $c^{13}$, and at the other end to a suitable adjustable stud 100 fixed to an arm $c^{20}$ of the lever $c^{10}$ (see Fig. 1). As the lever arm $c^{13}$ is rocked toward the shaft $c^{17}$, the stud $44^{\times}$ is moved at a speed faster than the arm $c^{20}$ and thus operates in conjunction with the arm $c^{20}$ to tighten the brake band and when the lever takes its final step in this direction, by reason of the coaction of lug 133 and depression 132, the effect is simultanously to release the clutch as above described and to apply the final tightening pull to the brake band. Evidently this is an effective arrangement for securing an accurate arrest of the machine at a predetermined point.

The action of the clutch-releasing motor spring $c^{15}$, when allowed to take its normal course, is to negative indirectly the effect of the clutch-engaging tendency of the motor spring 119. The spring $c^{15}$ introduces the cam 120 on the finger 101 into the rotary path of the end of the pusher 121, and the momentum of the pusher and its support slide the pusher along the face of said cam and thereby move said pusher endwise in its seat against the flange 125 to oppose and overpower the spring 119. While it may be that the initial force exerted through the cam on the pusher is not itself in the right direction to be wholly effective in moving the pusher endwise, it is nevertheless true that one component of said initial force will be effective to so move the pusher and this one component is the only one whose impulse is transmitted by the pusher to the flange 125 and therethrough to the driving member. As already observed, this one component which is permitted to act on the driving member acts in the same direction in which said member is to be moved. When the arm $c^{13}$ is rotated away from shaft $c^{17}$ (as by being depressed through a treadle rod $c^{12}$) the effect of the spring $c^{15}$ will be negatived, the clutch-releasing instrumentalities will be withdrawn from operation, and the spring 119 will be left free to engage the clutch automatically.

The above described clutch mechanism operates in general as follows. Normally the clutch is in released position when the operator is not exercising his control; the lever arms $c^{10}$ and $c^{13}$ are at the limit of their motion toward the shaft $c^{17}$; the cam 120 on the finger 101 is in engagement with the pusher 121 which is held forcibly against the flange 125 in opposition to the spring 119 to separate the driving member 127 from the driven member 103. The lug 133 is in the position on the depression 132 where it rested when the machine was last stopped. The brake band 84 is drawn tightly about the hub 122 by the spring $c^{15}$ acting through the lever arm $c^{13}$. The driving member alone is rotating upon the sleeve 126, said sleeve and all the other parts remaining stationary. If now the operator depress the arm $c^{10}$, the arm $c^{13}$ will be rotated away from the shaft $c^{17}$, freeing the pusher 121 and permitting it to be pushed back by the flange 125 under the influence of the now unimpeded motor spring 119. Simultaneously the motor spring 119 acts upon the driving member 127 to press it into close association with the driven member 103 whereupon the frictional engagement of their clutch-surfaces forces the driven member to accommodate itself at once to the rotation of the driving member. Immediately the shaft $c^{17}$ and sleeve 126 begin to rotate concurrently with the two main clutch members. At this stage all the parts are rotating.

When it is desired to stop the machine, the operator frees the arm $c^{10}$. The arm $c^{13}$ is moved toward the shaft by the motor spring $c^{15}$. If the lug 133 strikes on the surface of the hub the cam 120 on the finger 101 is prevented from touching the pusher 121. As soon however as the lug 133 can coact with the depression 132 the arm $c^{13}$ reaches the limit of its operative movement toward the shaft and takes position in the path of the pusher. The pusher in its rotation impinges against the cam and thereupon forces the flange 125 back in opposition to the spring 119 and releases the clutch. At the same moment that the positive drive of the driving member is removed, the brake 84 is applied to counteract the momentum of the parts so that the driven member is brought to a sudden standstill, though without any material shock. At this point the importance of some such provision as the flange 125 is evident. If the flange were not interposed between the pusher 121 and the driving member, that is to say, if the action of the pusher were applied directly to the driving member, the pusher when stationary would be in constant frictional contact with the driving member and would be maintained therein by the normal action of the spring $c^{15}$ and arm $c^{13}$. This frictional contact would commence as soon as the speed of the driven member decreased below that of the driving member, and subsequently the friction would increase until it reached its maximum when the driven member became stationary. Thus the arrest of the driven member would be rendered much more difficult and the two relatively moving contacting parts would be subjected to a very destructive wear. The introduction of the flange 125 removes these difficulties because the driving member will merely ride free on its bearings and will not have any localized frictional contact such as it would have with the head of the eccentrically arranged pusher. The fact that the flange is employed in coöperation with the sleeve 126 results in an important advantage. When the clutch is released the driving member is removed from normal lateral contact with any portion of the clutch and rides free with little friction on its bearings. The driving member is entirely independent of the driven member except through the agency of the sleeve so that minimum resistance is offered to stopping the driven member. Only one embodiment of the invention is shown herein, and it will be obvious that many changes in the construction of the parts might be made without departing from the invention.

Having described my invention, what I claim as new and desire to secure by Letters Patent of the United States is:—

1. In a device of the class described, a shaft, a member loose thereon, a second member rigid with the shaft, an automatically actuated disengaging device carried by one of the members and slidable therethrough to effect the disengagement of said members.

2. A shaft, a member loose thereon, a second member rigid with the shaft, means tending to effect operative engagement of said members to rotate the shaft, and automatically actuated means carried in said rigid member adapted to effect the disengagement of said members.

3. A shaft, a loose member on the shaft, a member rigid with the shaft, means tending to effect operative engagement of said members to rotate the shaft, a disengaging device slidably mounted in the rigid member, and means to operate said device positively to release said members.

4. A shaft, a member fixed to the shaft, a sleeve movable on the shaft, a loose member carried on the sleeve, and means mounted in the fixed member for moving the sleeve to permit the disengagement of said members.

5. A shaft, a member fixed to the shaft, a sleeve slidable on the shaft, a loose member carried on the sleeve, means tending to effect the operative engagement of the fixed and loose members, and a disengaging device carried by the fixed member and adapted to slide said sleeve on the shaft to permit the disengagement of the said members.

6. In apparatus of the class described, coaxially arranged and adjacent driving and driven members, a shaft rotatable with the latter member, means tending to effect cooperative engagement of said members to rotate the shaft, means carried by one of said members and adapted to act upon the other member to effect their disengagement, and a controller to govern the operation of said disengaging means.

7. A shaft to be rotated, having a fixed pulley thereon, a loose pulley mounted on said shaft at one side of the fixed pulley, means tending to effect driving engagement of said pulleys, means carried by the fast pulley to effect the release of said pulleys from driving engagement, and a manually actuated controller to govern the operation of said disengaging means.

8. A shaft having a fixed pulley, a loose pulley mounted on said shaft at one side of the fixed pulley, a sliding sleeve within the hub of the loose pulley and surrounding the shaft, an expanding spring surrounding the shaft at the outer end of the loose pulley, to force said pulleys into driving engagement, and means to move the sleeve to compress the spring and thereby permit withdrawal of the loose from the fixed pulley.

9. A shaft to be rotated, a member to be driven fixedly connected with and to rotate the shaft, a longitudinally movable sleeve loosely mounted on the latter, a driving member the hub whereof loosely surrounds the sleeve, spring-acting means at the outer side of the driving member, to force it into driving engagement with the member to be driven, a releasing device carried by the driven member, and means to operate said device to move the sleeve to compress the spring, to thereby effect release of the driving and driven members.

10. A shaft having a fixed pulley, a pulley loose on said shaft at one side of the fixed pulley, a sliding sleeve interposed between the hub of the loose pulley and the shaft, and surrounding the latter, an expanding spring surrounding the shaft at the outer side of the loose pulley to force said pulleys into driving engagement, a pusher carried by the fixed pulley, and means to slide said pusher to move said sleeve away from the fixed pulley to thereby compress the spring to effect the release of the two pulleys.

11. A shaft, a fixed pulley thereon having its hub provided with a recess, a pusher extended through said pulley, a loose pulley, a spring tending to move the loose pulley into driving engagement with the fixed pulley, a movable sleeve in the loose pulley, and a lever having a lug to enter the recess of the hub, said lever when its lug enters the recess being positioned to move the pusher to actuate the sleeve and thereby compress the spring, to free the loose pulley from the fixed pulley.

12. A driving member, a member to be driven, a shaft rotatable therewith, a spring to move one of said members laterally to effect operative engagement with the other member to rotate the shaft, means carried by one of said members to compress the spring to permit disengagement of the driving and driven members, and a controlling device for said means, operative automatically in one direction to effect compression of the spring, and operative manually in the other direction to render said means inoperative when operative engagement of the driving and driven members is to be effected.

13. A clutch mechanism having, in combination, clutch members, two automatic clutch-throwing instrumentalities, arranged to cause respective forces to shift one of said clutch members axially; and means for applying each of said forces to said clutch member in that direction only in which said member is to be moved.

14. A clutch mechanism having, in combination, a mechanical motor for engaging the clutch; a second mechanical motor for causing the release of the clutch; and means whereby the respective forces, set in operation by said motors, are applied to act on the clutch in opposite directions only and axially of the clutch.

15. A clutch mechanism having, in combination, a mechanical motor for engaging the clutch; a mechanical motor for causing the release of the clutch; means intermediate said motors whereby one of said motors normally negatives the action of the other; and means whereby the respective forces set in operation by said motors are applied to act on the clutch in opposite directions only and axially of the clutch.

16. A clutch mechanism having, in combination, a driving member and a driven member, said members being adapted to be separated or united respectively to release or engage the clutch; a mechanical motor which causes the separation of said members by a force which is finally applied in that direction only in which the separation is to take place; and means for uniting said members by a force which acts only in the direction in which the parts are moved to be united.

17. A clutch mechanism having, in combination, clutch members; means supplying an initial force to move one of said members; a link intermediate said means and said member, upon which said initial force is exerted, said intermediate link being arranged to transmit but one component of said initial force to said member.

18. A clutch mechanism having, in combination, clutch members; a motor supplying an initial force to move one of said members; means intermediate the motor and said member which transmit to said member but one component of said initial force, said component acting in the direction in which the movement of said member is to take place.

19. A clutch mechanism having, in combination, clutch members of which one can be shifted; a shifting device independent of said member for controlling the shift thereof in either direction; and means for applying a force to said shifting device to shift said member.

20. A clutch mechanism having, in combination, clutch members; automatically operative means for applying a force to shift one of said members, a shifting device intermediate said means and said member which controls the shift of said member, the force applied by said means being exerted on said shifting device alone in the direction in which the member is to be moved.

21. A clutch mechanism having, in combination, a shaft; a clutch member on said shaft; a sleeve axially movable on said shaft; a second clutch member rotatable on said sleeve; and means for shifting said second clutch member by applying a force to said sleeve in the direction in which said member is to be shifted.

22. A clutch mechanism having, in combination, a shaft; a clutch member on the shaft; a sleeve on the shaft; a second clutch member rotatable on the sleeve; and means for moving said second clutch member by applying force to said sleeve.

23. A clutch mechanism having, in combination, a driving member; a member to be driven; a shaft to support said members; a flange loose on said shaft intermediate the said members; clutch-engaging means; and clutch-releasing means which act on said flange to release the clutch.

24. A clutch mechanism having, in combination, clutch members; a shaft to support said members; a sleeve on the shaft, intermediate the shaft and one member, which controls the release and engagement of the clutch; an automatic clutch-engaging instrumentality acting on one end of said sleeve to engage the clutch; and automatically actuated means, rotatable normally only in consonance with the sleeve, for moving the sleeve to release the clutch.

25. A clutch mechanism having, in combination, an active driving member; a passive driven member; a shaft to support said members; a sleeve on the shaft, intermediate the shaft and driving member, which controls the release and engagement of the clutch; an automatic clutch engaging instrumentality acting on the hub of said active driving member to engage the clutch; and automatically actuated means, rotatable normally only in consonance with the sleeve, for moving said sleeve in a direction to release the clutch, said means acting upon said sleeve in that direction only in which the sleeve is moved thereby.

26. A clutch mechanism having, in combination, an active driving member; a passive driven member; a shaft to support said members; a sleeve on the shaft intermediate the shaft and driving member; a spring interposed between the hub of the active driving member and a stationary abutment to give said driving member axial movement toward the driven member; and an automatically actuated pin which is forced against the other end of said sleeve to move said driving member axially against the tension of said spring.

27. A clutch mechanism having, in combination, clutch members arranged to be separated or united to throw the clutch out of or into engagement, a shaft to support said members; a sleeve intermediate said shaft and one of the members; said sleeve being arranged to control the axial movement of said member and to rotate normally only in consonance with the other member; an automatic clutch engaging instrumentality which exerts a force on said sleeve in one direction only; an automatic clutch releasing instrumentality, under the control of the operator, which automatically causes an initial force to be exerted to release the clutch; and means whereby the action of said initial force is applied to said sleeve in one direction only.

In testimony whereof, I have signed my name to this specification, in the presence of two subscribing witnesses.

LOUIS A. CASGRAIN.

Witnesses:
  GEO. W. GREGORY,
  EDITH M. STODDARD.